(12) United States Patent
Western et al.

(10) Patent No.: US 6,769,086 B2
(45) Date of Patent: Jul. 27, 2004

(54) APPARATUS AND METHODS FOR A CODING SCHEME SELECTION

(75) Inventors: Gary E. Western, Round Lake, IL (US); Sriram S. Chaturvedi, Schaumburg, IL (US); Parthasarathy Subramanian, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 72 days.

(21) Appl. No.: 10/200,367

(22) Filed: Jul. 22, 2002

(65) Prior Publication Data

US 2004/0013095 A1 Jan. 22, 2004

(51) Int. Cl.[7] ............................ H03M 13/00; H04L 1/18
(52) U.S. Cl. .................... 714/751; 455/560; 455/67.11; 370/329; 714/704
(58) Field of Search ................................ 714/704, 751; 375/377, 240, 23–24, 224, 225, 219; 370/252, 466, 329, 401, 477; 455/522, 69, 445, 452.2, 560, 67.11

(56) References Cited

U.S. PATENT DOCUMENTS

| | | | | |
|---|---|---|---|---|
| 6,400,928 B1 | * | 6/2002 | Khullar et al. ............ | 455/67.11 |
| 6,567,375 B2 | * | 5/2003 | Balachandran et al. ..... | 370/204 |
| 2003/0198312 A1 | * | 10/2003 | Budka et al. ................ | 375/377 |

OTHER PUBLICATIONS

Englund 'Nonlinear unequal error–protection codes exceeding the Katsman bound;' Symposium on Information Theory, 1994. Proceedings. 1994 IEEE International; Jun. 27–Jul. 1, 1994; Page(s): 502.*

Sun et al. 'Adaptive two–level unequal error protection convolutional code scheme for wireless ATM networks,' INFOCOM 2000. Nineteenth Annual Joint Conference of the IEEE Computer and Communications Societies. Proceedings. IEEE vol.:3; Mar. 2000.*

* cited by examiner

*Primary Examiner*—Guy J. Lamarre
(74) *Attorney, Agent, or Firm*—Marshall, Gerstein & Borun LLP

(57) ABSTRACT

A method for transitioning from a lower channel coding scheme to a higher channel coding scheme in a communication network providing transmission of data encoded using one of a plurality of channel coding schemes, the transmission occurring between the communication network and a number of mobile stations via a corresponding number of radio links, the communication network having at least one base transceiver station operatively coupled to a packet control unit. The method includes applying the higher channel coding scheme to a portion of data transmitted between the communication network and the mobile station, and, after a predetermined time period, noting a data block error rate of the portion of data. The method further includes directing application of the higher channel coding scheme to all future data transmitted if the data block error rate indicates an equivalent or higher data throughput of the portion of data.

21 Claims, 12 Drawing Sheets

APPARATUS AND METHODS FOR A CODING SCHEME SELECTION

FIELD OF THE DISCLOSURE

This disclosure relates generally to wireless communication networks, and more particularly to a method and apparatus for fractional downlink channel coding scheme selection in a general packet radio system.

BACKGROUND

Wireless communication networks, such as cellular telephone communication networks, are commonplace. Wireless communication networks may comply with one or more standards or recommendations, such as the Global System for Mobile communication (GSM) recommendations. A system operating according to the GSM recommendations will typically include a switching system (SS), a base station system (BSS) and an operation and support system (OSS).

The base station system provides all of the radio-related functions, and the BSS typically includes one or more base station controllers (BSCs) and a plurality of base transceiver stations (BTSs). The base station controller provides all the control functions and physical links between the switching system and the base transceiver station. The base station controller is a high-capacity switch that provides functions such as handover, cell configuration, and control of radio frequency (RF) power levels in the base transceiver stations.

The BTS handles the radio interface to the mobile station (MS). The mobile station is the subscriber equipment used to access the wireless communication network. The base transceiver station includes the radio equipment (transceivers, antennas, amplifiers, etc.) needed to service each cell in the network. A group of base transceiver stations is controlled by a base station controller.

The operation and support system is the functional entity from which the network operator monitors and controls the system. The purpose of the OSS is to provide centralized, regional and localized operation and maintenance activities required for wireless communication network operation. For example, the operation and support system provides a network overview and supports maintenance activities of different operation and maintenance organizations. The operation and support system may include an operation and maintenance center (OMC) coupling all the equipment in the wireless communication network.

The switching system is responsible for performing call processing and subscriber related functions. The switching system includes the home location register (HLR), the mobile services switching center (MSC), visitor location register (VLR), authentication center (AUC) and equipment identity register (EIR).

As the popularity of GSM-based wireless voice communication services increased, so too did the need for nonvoice (i.e., information, data, etc.) wireless communication services. The circuit switched network architecture of GSM, however, proved to be limited in its capability to deliver high speed non-voice communications. As a result, General Packet Radio Service (GPRS) communication networks capable of supplementing circuit switched networks with packet switching functionality have been overlaid on existing wireless communication networks such as GSM.

Using GPRS, non-voice downlink data is separated into related "packets" by a packet control unit (PCU), the packets with instructions are forwarded to the BTS, the received packets are transmitted as data "blocks" by the BTS, and then using the relationship, the MS reassembles the data blocks upon receipt. Thus, the PCU manages, allocates, and schedules the use of packet data resources necessary to establish downlink packet data transmission between the infrastructure and the mobile stations and uplink packet data transmission between mobile stations and the infrastructure. In addition, to reduce the cost of deploying these systems, PCUs may be remotely located from the BTSs that maintain the wireless links between the mobile units and the infrastructure.

Transmission of both downlink and uplink user data is accomplished, via selection and subsequent application by the PCU of one of a number of a GPRS packet data traffic channel (PDTCH) coding schemes. Each of the GPRS PDTCH channel coding schemes offers a different level of error protection at different resource costs; channel coding schemes providing higher error protection requires more resources while channel coding schemes providing lower error protection requires less resources. The selection (based on bit error rates and block error rates of the transmitted user data, local interferers, etc) is based on a number of channel factors and therefore may vary over the life of a data or voice call. Thus, the PCU must dynamically direct the transitions between and among the appropriate GPRS PDTCH coding schemes.

Unfortunately, current methods of transitioning from a lower GPRS PDTCH coding scheme to a higher GPRS PDTCH coding scheme often reflect the consequences of a poor choice by the PCU, and result in high bit error and block error rates, retransmission of data, and overall lower data throughput to an end user.

DETAILED DESCRIPTION

In accordance with a preferred embodiment of the invention, a communication network provides wireless communication services, such as wireless data communication services, to a plurality of mobile stations operating within the communication network. Stated specifically, an algorithm for implementing three intermediate channel coding schemes, is described herein.

Figure 1:
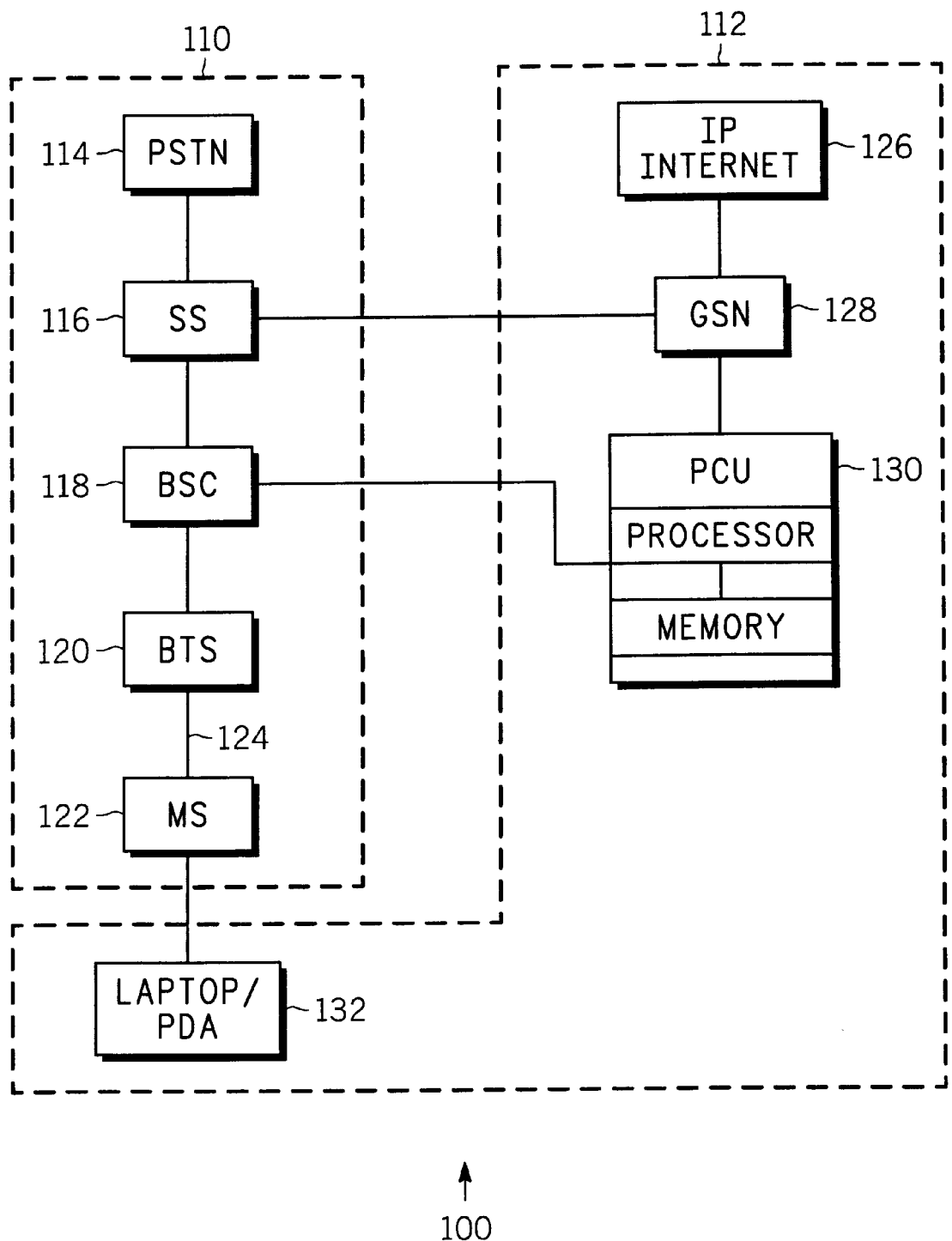
FIG. 1 is a block diagram of a wireless communication network, including a GPRS network that may be adapted in accordance with the preferred embodiments of the invention.

FIG. 1 is a block diagram of a wireless communication network 100, including a general packet radio service (GPRS) specific network configuration 112 that may be adapted in accordance with the preferred embodiments of the invention. Referring to FIG. 1, the wireless communication network 100 includes a (1) a wireless voice communication portion herein referred to as a "global system for mobile communications" (GSM) portion 110, and a (2) wireless non-voice, or information, communication portion herein referred to as the GPRS specific network configuration 112.

The addition of the GPRS specific network configuration 112 to the GSM portion 110 enables a packet based air interface to be overlaid on an existing circuit switched based GSM network, thereby providing wireless non-voice transmission capability. Utilization of a packet based air interface enables increased spectrum efficiency (as compared to a circuit switched based air interface) because wireless resources are used only when a user is actually sending and receiving data-a dedicated channel radio channel for a fixed period of time is not required.

The GSM portion 110 includes a public switched telephone network (PSTN) 114, a switching system (SS) 116, one or more base station controllers (BSC) 118, one or more base transceiver systems (BTS) 120 and one or more mobile stations, one of which is shown as MS 122. The GSM portion 110 provides wireless voice communication services to the MS 122 traveling in a coverage area associated with the BTS 120.

As shown, the SS 116 is operatively coupled to the PSTN 114 and the BSC(s) 118 via well-known methods, and is configured to provide intelligent switching, or routing for voice to and from the PSTN 114 to the MS 122 via the BSC 118 and the BTS 120. The BSC 118 is operatively coupled to the BTS(s) 120 via standard E1 link(s) configured to enable voice transmission via a vendor specific protocol between the BSC 118 and the BTS(s) 120. Voice communication between the mobile station, 122 and the BTS 120 occurs over an associated communication resource, or a communication channel 124 via a voice Traffic Channel (TCH). Accordingly, the communication channel 124 may be a frequency or frequency pair, a time slot, a spreading code or combinations thereof.

The GPRS specific network configuration 112 of the communication network 100 includes an IP Internet, 126, a GPRS support node (GSN) 128, a packet controller unit (PCU) 130 and a laptop or PDA, 132 for end-user terminal use. Operation of the GSN 128, the PCU 130, the BSC 118, and the BTS 120 are well known in the field of wireless communications and is described in the European Telecommunications Standards Institute (ETSI)—3$^{rd}$ Generation Partnership Project—Digital Cellular Telecommunications System—General Packet Radio Service standard (ETSI 3GPP). Thus, the MS 122 preferably comprises a wireless mobile unit that communicates in accordance with the GPRS standard to transmit and receive wireless non-voice communication, for example, wireless data.

As shown, the GSN 128 is operatively coupled to the IP internet 126 and the PCU 130 using well known methods. The PCU 130 is operatively coupled to the BSC 118 via a standard E1 link utilizing a GPRS signaling protocol. The GSN 128 is also operatively coupled to the SS 116 to provide intelligent switching, and paging capability to the MS 122 via the PCU 130, the BSC 118, and the BTS 120. The BSC 118 is operatively coupled to the BTS(s) 120 via standard E1 link(s) configured to enable non-voice transmission, or data packet transfer, via a vendor specific GPRS transport protocol between the BSC 118 and the BTS(s) 120. Data packet transfer between the mobile station 122 and the BTS 120 occurs over the communication channel 124 via a Packet Data Traffic Channel (PDTCH) defined in the ETSI 3GPP.

As is known, non-voice communication from the BTS 120 to the MS 122 may be referred to as the downlink data packet transfer (from the wireless network) while non-voice communication from the MS 122 to the BTS 120 may be referred to as the uplink data packet transfer (to the wireless network).

As will be appreciated by those of ordinary skill in the art, the wireless voice communication portion of the wireless communication network 100 can be achieved in any number of ways, for example, via any time division multiple access (TDMA) protocol.

Figure 2:
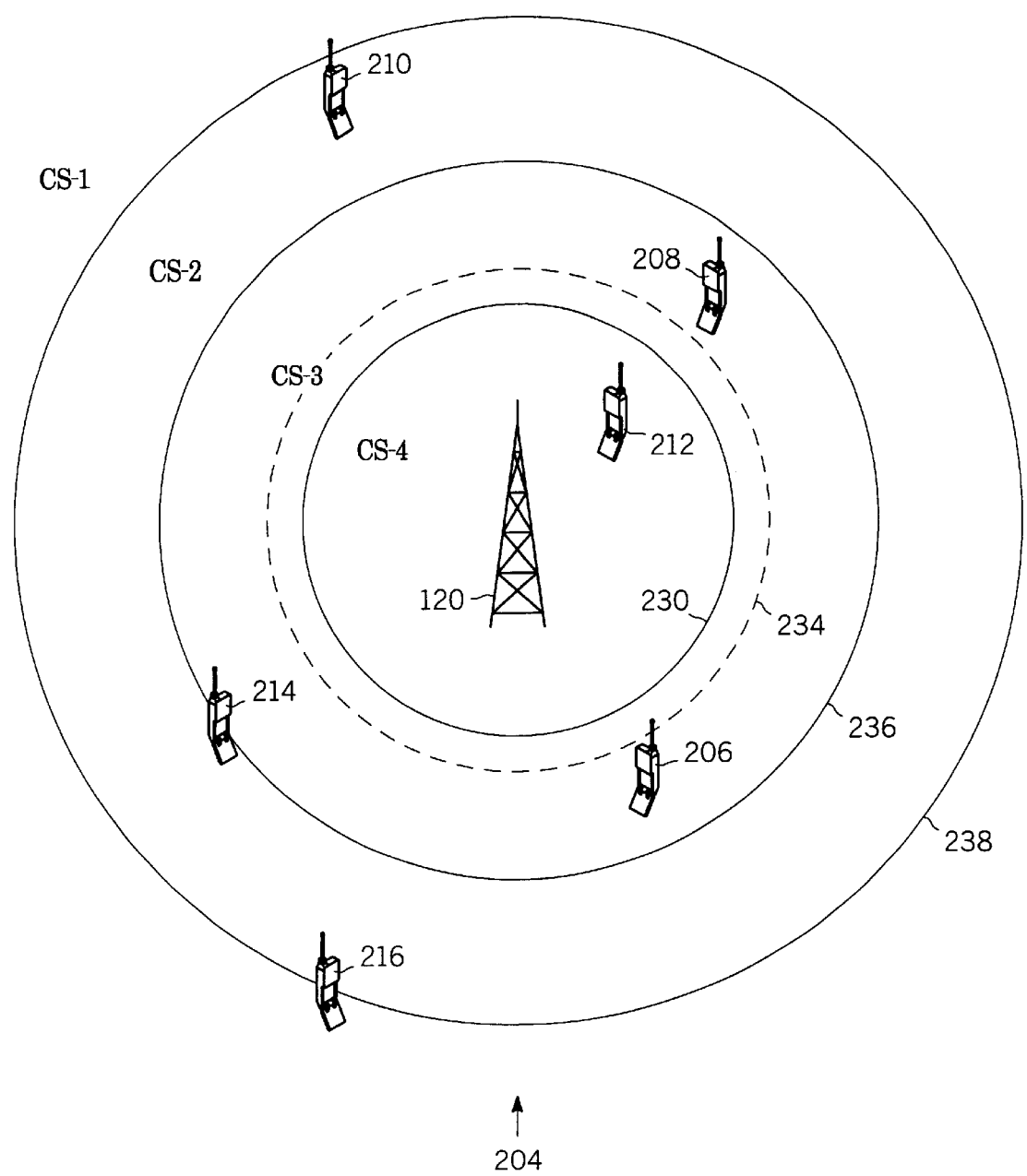
FIG. 2 is a graphical illustration of an example coverage area serviced by a BTS of the wireless communication network illustrated in FIG. 1.

FIG. 2 is a graphical illustration of an example coverage area serviced by the BTS 120 of the wireless communication network 100 illustrated in FIG. 1. Referring to FIG. 2, the BTS 120 services a coverage area, 204, such as a cell of a cellular network. A plurality of mobile stations 206–216 operate within the coverage area 204 at varying distances from the BTS 120. The mobile stations 206–216 may be cellular telephones, pagers, personal digital assistants, or combinations thereof, suitable for both wireless voice and non-voice communication with the BTS 120. Because of its physical relationship to the BTS 120 (e.g., distance, position relative to obstructions, position relative to interferers) the characteristics of the communication resource (e.g., the communication channel 124), coupling each MS 206–216 to the BTS 120 vary with respect to each other and time. The characteristics may include path loss, bit error rate, block error rate, signal-to-noise ratio and the like. Moreover, while the proximity of two mobile stations to the BTS 120 may suggest that each are experiencing similar communication channel characteristics, such may not necessarily be the case.

As previously mentioned in connection with FIG. 1, the PCU 130 manages, allocates, and schedules the packet data resources necessary to allow uplink and downlink packet data transmission between the MS 124 and its associated wireless communication network. Specifically, a packet resource manager (not shown) within the PCU 130 receives data, determines how to best "package" the data, and then instructs (via control instructions) the BTS 120 to package the data accordingly. Once received by the MS 122 from the BTS 120, the data packages are "unpackaged" and reassembled, thereby completing the transmission of the data.

For example, layer 2 user data bits received by the PCU 130 from the IP internet 126 via the GSN 128 (resulting from a particular software application) are in the form of Logic Link Control (LLCs) frames. Upon receipt, the PCU 130 splits each of the LLCs into segments of bits and inserts additional bits (e.g., polling bits, data encoding instructions, etc.). The resulting blocks of bits, herein referred to as "segmented blocks," are forwarded to the BTS 120. Based on the data encoding instructions embedded in the segmented blocks by the PCU 130, the segmented blocks are encoded, or modulated, by the BTS 120 using one of a number of GPRS channel coding schemes, and transmitted to the MS 122 as GPRS radio blocks. Current GPRS coding schemes selectable by the PCU 130 include Coding Scheme 1 (CS-1), CS-2, CS-3, or CS-4 (see, FIGS. 3–6) and Modulated Coding Scheme 1 (MCS-1), MSC-2, MSC-3, MSC-4, MSC-5, MSC-6, MSC-7, MSC-8, and MSC-9.

The particular GPRS channel coding scheme selected by the PCU 130 is based on whether the data is control data requiring maximum protection for transmitted bits, or maximum data integrity, (i.e., requiring CS-1 channel coding), or whether the data is user data. If the data is user data, varying coding schemes (i.e., CS-1 through CS-4) may be selected based on a variety of channel factors such as channel robustness, physical proximity of the MS 124 to the BTS 120, the presence of local interferers, and the like, bandwidth, BTS channel capacity, etc. In addition to performing block segmenting and channel coding selection, the PCU 130 determines an order of data transmission of the data from the BTS 120 to the MS 122.

Thus, upon the determination of the channel encoding scheme (e.g., CS-1 for control data, CS-2 for user data), the PCU 130 instructs the BTS 120 as to which channel encoding scheme to use for a particular GPRS radio block via the data encoding instructions embedded in the segmented blocks to the BTS 120. Accordingly, based on the instructions, the BTS 120 channel encodes the data into the GPRS radio blocks suitable for transmission over the Packet Data Traffic Channel between the BTS 120 and the MS 122. For ease of discussion, the GPRS radio blocks carrying encoded data may be referred to herein as "GPRS data blocks".

Figure 3:
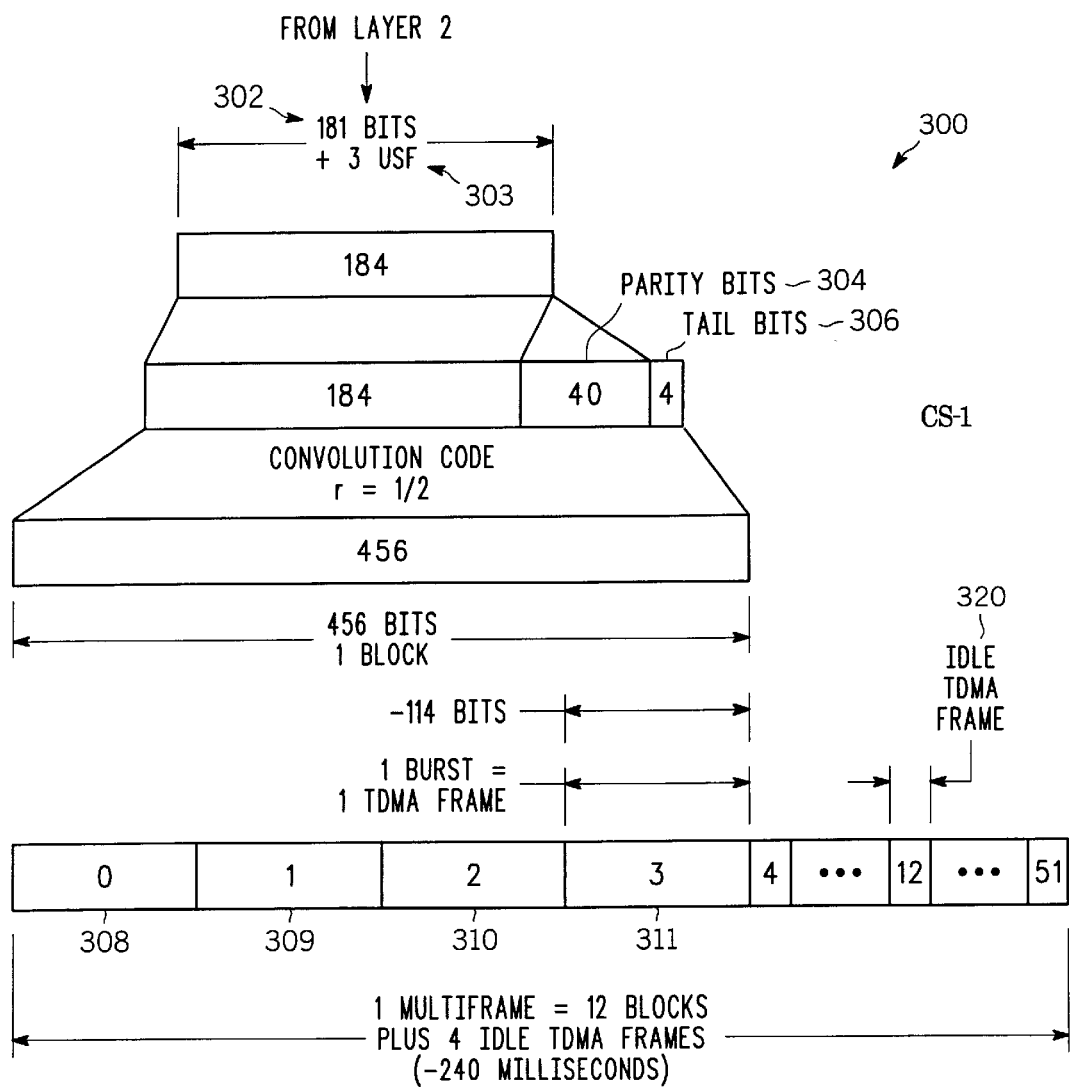
FIGS. 3–6 are illustrations of four channel coding schemes for GPRS PDTCH.

FIG. 3 is an illustration of a channel coding scheme, 1 (CS-1) 300 for maintaining maximum data integrity of GPRS radio blocks in a GPRS PDTCH. Referring to FIG. 3, for the CS-1 300, 181 Layer 2 bits resulting from applications (e.g., email, web browser, paging, etc.) as well additional information bits inserted by the PCU 130, and forwarded to the BTS 120. (Of course, as is known, thousands of bits of layer 2 data may be received by the PCU 130 from a particular application). Based on the number of bits received and the information bits inserted by the PCU 130, a predetermined number of uplink state flag (USF) bits 303 are added to the 181 Layer 2 bits 302 by the BTS 120 (vis., a channel encoder of the BTS 120). The USF bits 303 are configured to notify a particular MS 122 that it has uplink transmission rights. Similarly, parity bits 304 and tail bits 306 are added to the 181 Layer 2 bits for error correction, herein referred to as a "block check sequence" (BCS). The addition of the USF bits 303, the parity bits 304 and the tail bits 306 to the Layer 2 bits 302 results in 228 bits to be encoded. To maximize data integrity during transmission, each of the 228 bits of data is copied, resulting in 228 original bits and 228 copied bits for a total of 456 bits (i.e., a ½ code rate) to be transmitted from the BTS 120 to the MS 122. As is known in the art, each group of 456 bits may be referred to a one GPRS data block. The 456 bits are distributed among four "bursts" containing approximately 114 bits/burst (i.e., one TDMA frame) shown in FIG. 3 as bursts, 308, 309, 310, 311. Thus, two copies of each the original 181 Layer 2 bits 302 are transmitted from the BTS 120, thereby increasing the odds that each of the original 181 Layer 2 bits 302 are received by the MS 122.

Typically, the four bursts 308–311 are transmitted with forty-four additional bursts, 312 (representing eleven additional GPRS radio blocks), and four idle bursts (i.e., TDMA frames) in a "multiframe" configuration. As shown in FIGS. 3–6, a multiframe 320 is transmitted in approximately 240 milli-seconds. Upon receipt of the multiframe(s) 320, using well-known methods, bits inserted in the bursts by the BTS 120 at the direction of the PCU 130 are used by the MS 122 to decode and reconstruct the data is a form suitable for receipt by an end user.

Of course, as will be appreciated by those of ordinary skill in the art, the "cost" of using the CS-1 scheme is high in terms of bandwidth resources; one-to-two. As a result, the GPRS PDTCH channel coding schemes CH-2, CH-3, and CH-4 are constructed to more efficiently utilize bandwidth resources, depending on the quality or robustness of the communication channel 124. More particularly, CH-2 and CH-3 utilizes controlled bit reduction, herein referred to as "bit puncturing" to reduce the amount of copied data bits transmitted. Moreover, CH-4 adds only USF and parity bits to the original layer 2 bits prior to transmission to the MS 122; no copied bits are transmitted.

Figure 4:
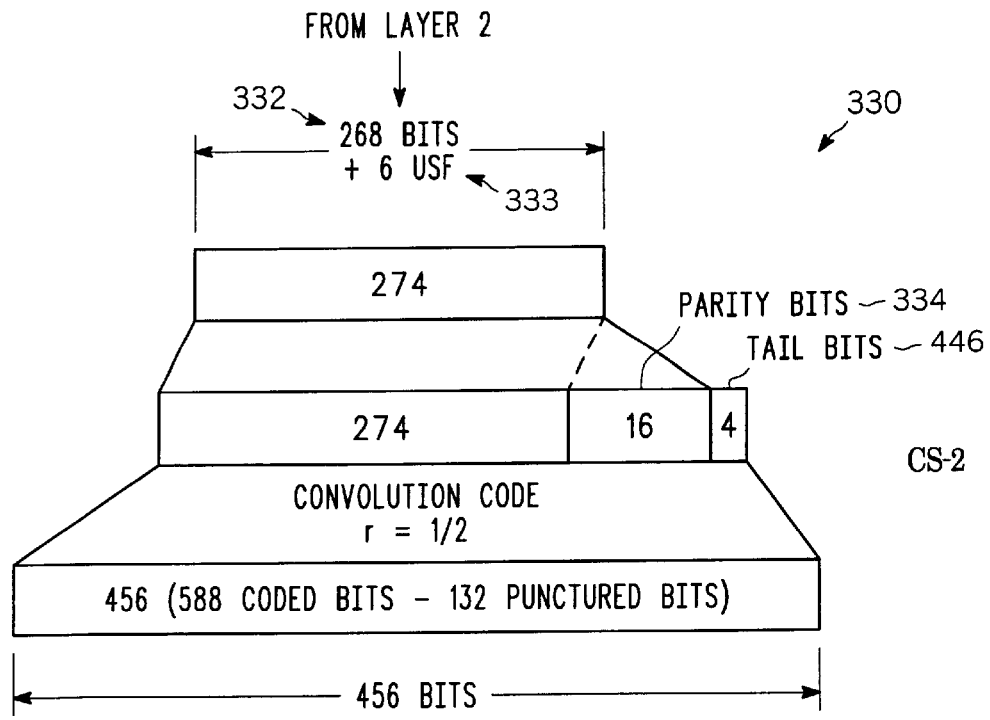

For example, FIG. 4 is an illustration of a channel coding scheme 2 (CS-2) 330 where approximately ⅓ of the copied bits are punctured. Referring to FIG. 4, for CS-2, 268 Layer 2 bits 332 are transmitted from the PCU 130 to the BTS 120. Similar to CS-1 300, 6 USF bits 333, 16 parity bits 334 and 4 tail bits 336 are added to the 268 Layer 2 bits 332. The addition of the USF bits 333, the parity bits 334 and the tail bits 336 to the Layer 2 bits 302 results in 294 bits to be encoded. Each of the 294 bits of data is copied resulting in 294 original bits and 294 copied bits for a total of 588 bits. Of the 588 bits however, only 456 bits are transmitted (i.e., a ⅔ code rate) from the BTS 120 to the MS 122. The remaining, 132 are selectively discarded based on known statistics. Thus, the original 268 Layer 2 bits 332 and approximately ⅔ of the copied 268 layer 2 bits are transmitted from the BTS 120 to the MS 122.

Figure 5:
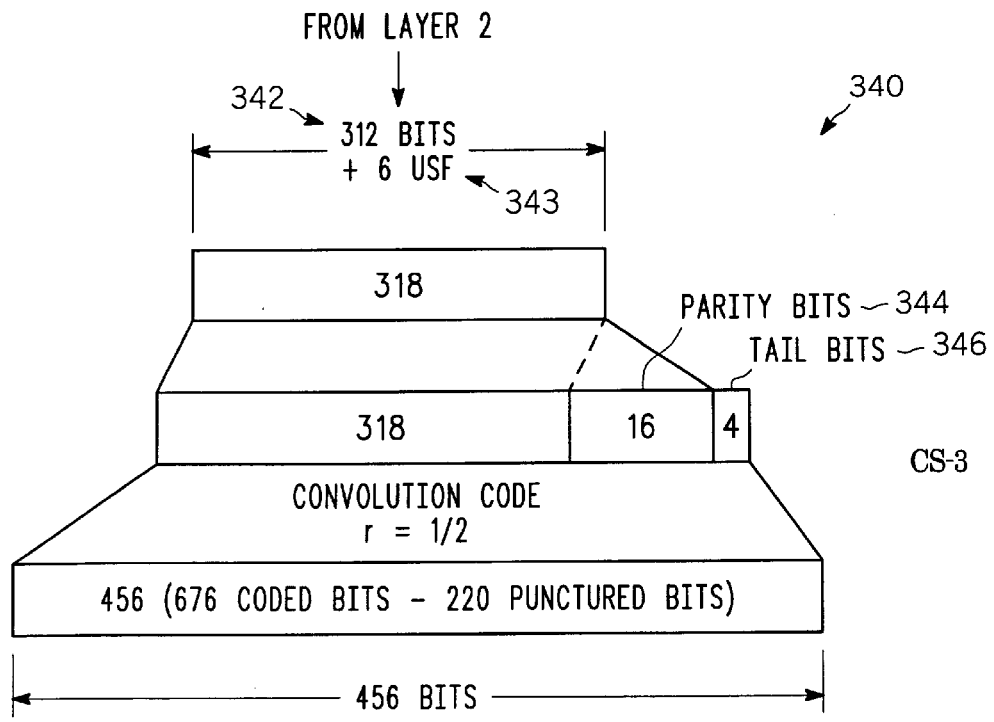

FIG. 5 is an illustration of a channel coding scheme, 3 (CS-3) 340 where approximately ⅔ of the copied bits are punctured. Referring to FIG. 5, for CS-3, 312 Layer 2 bits 332 are transmitted from the PCU 130 to the BTS 120. Like CS-2 330, 6 USF bits 343, 16 parity bits 344 and 4 tail bits 346 are added to the 312 Layer 2 bits 342. The addition of the USF bits 333, the parity bits 334 and the tail bits 336 to the Layer 2 bits 302 results in 338 bits to be encoded. Each of the 338 bits of data is copied resulting in 338 original bits and 338 copied bits for a total of 676 bits. Of the 676 bits however, only 456 bits are transmitted (i.e., a ¾ code rate) from the BTS 120 to the MS 122. The remaining 220 bits are selectively discarded based on known statistics. Thus, the original 312 Layer 2 bits 342 and approximately ⅓ of the copied 312 layer 2 bits are transmitted from the BTS 120 to the MS 122.

Figure 6:
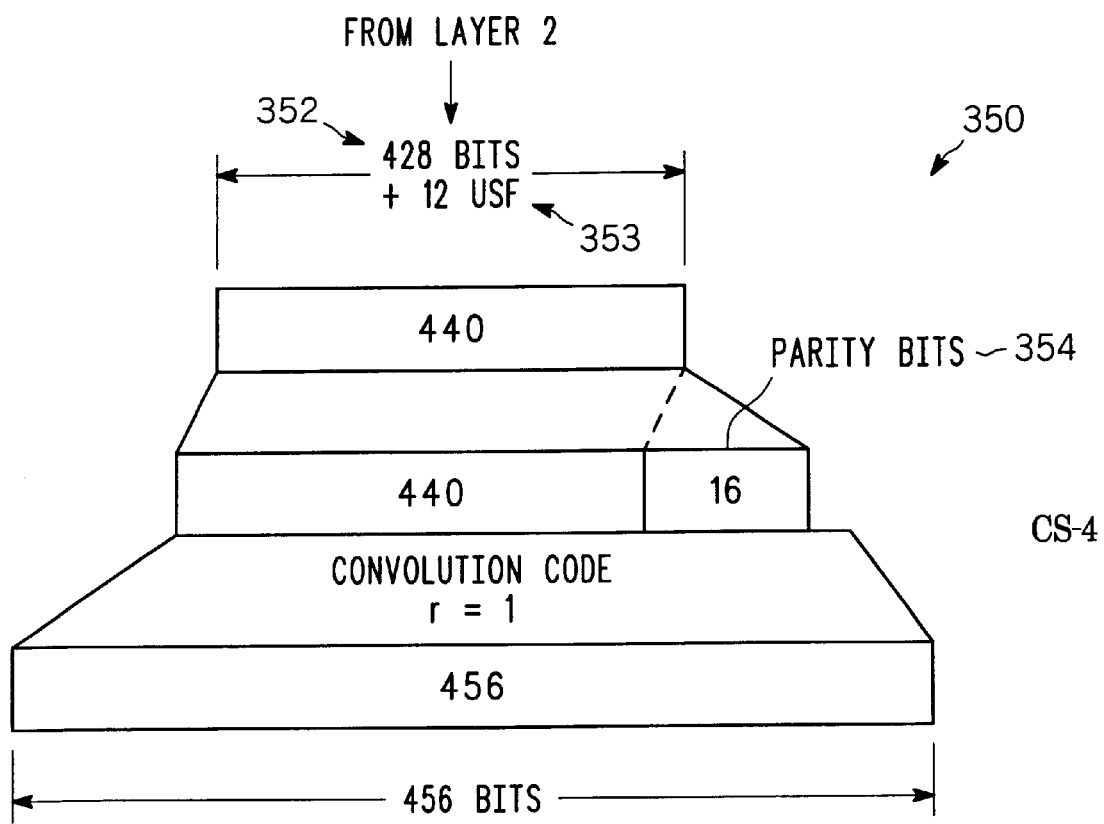

FIG. 6 is an illustration of a channel coding scheme, 4 (CS-4) 350 where no copied bits are generated and no bits are punctured. Referring to FIG. 6, for CS-4, 428 Layer 2 bits 352 are transmitted from the PCU 130 to the BTS 120. Unlike coding schemes CS-1, CS-2, and CS-3, only USF bits 353 and parity bits 354 are added to the Layer 2 bits. The addition of 12 USF bits 353 and 16 parity bits 354 to the 428 Layer 2 bits 352 results in exactly 456 bits. Thus, only the original 428 Layer 2 bits 352 are transmitted from the BTS 120 to the MS 122.

Accordingly, the CS-4 350 provides the most efficient utilization of bandwidth resources and is therefore the coding scheme of choice when channel conditions of the communication channel 124 permits (i.e., optimum channel conditions). Conversely, the CS-1 300 provides the most reliable scheme to ensure data integrity of the GPRS radio blocks received by the MS-1 and is therefor the coding scheme of choice when the communication channel 124 is adversely affected or when transmission of a control information message is required. The CS-2 330 and the CS-3 340 provide intermediate coding schemes and are typically upon initial transmission of user data or when the PCU 130 is transitioning between the coding schemes in an attempt to efficiently utilize bandwidth resources.

As will be appreciated by those of ordinary skill in the art, channel coding schemes for GPRS PDTCH can be achieved using a number of channel coding schemes, for example modulation and coding schemes, MCS-1 to MCS-9 suitable for use with enhanced GPRS.

Referring again to FIG. 2, an example GPRS channel coding scheme footprint including CS-1, CS-2, CS-3, and CS-4, is shown superimposed on the coverage area 204. As would be expected, the CS-4 coding scheme, defined by a CS-4 boundary line 230, is implemented in the area nearest the BTS 120. Moving away from the BTS 120, the CS-3 coding scheme (defined by a CS-3 boundary line 236) is implemented next, followed by the CS-2 coding scheme (defined by a CS-2 boundary, 238). Finally, the CS-4 coding scheme is implemented for user data transmitted in the area outside of the CS-3 boundary 238. Typically, CS-4 accounts for the interior 40% of a GPRS channel coding scheme footprint, CS-3 for the next 20%, CS-2 for the next 30%, and CS-1 for the remaining, 10%.

Referring again to FIG. 1, in operation, the PCU 130 selects an initial coding scheme (e.g., CS-2) upon receipt of user data from the GSN 128. The user data, the selected coding scheme, and managing parameters/instructions are forwarded to the BTS 120 for transmission to the MS 122. The BTS 120 then transmits the user data and the managing parameters to the MS 122. Periodically, the PCU 130 also directs the BTS 120 to send an acknowledgement request to the MS 122 via setting a "poll bit" in a number of the downlink data blocks. As is known, the use of the poll bit is dictated by the Radio Link Control (RLC) and Medium Access Control (MAC) layer defined in the ETSI 3 GPP and is utilized by the PCU 130 as an indicator of channel quality.

Based on a response to the poll bit and numerous other factors such as signal strength, block error rate, bit error rate, etc., the PCU 130 determines whether to direct the BTS 120 to move to a higher, and therefore more efficient, channel coding scheme, for example from CS-2 to CS-3. If the PCU 130 determines that use of a higher channel coding scheme is warranted, it will direct the BTS 120 accordingly and the data will be encoded and transmitted as discussed above in connection with FIGS. 3–6.

Unfortunately, in addition to potential interferers, the PCU 130 and the MS 122 are separated by several network entities (not all shown) that result in sizable transmit and receive delays (i.e., transit delays). The transit delays, or propagation delays, result in a number of the downlink GPRS data blocks to be "in transit" at any given time. Thus when initially directing the BTS 120 to move to a higher coding scheme, the PCU 130 must forecast, well in advance of receiving any acknowledgement from the MS 122, that the coding scheme transition will be successful. As is known, an erroneous forecast may result in high block error rates and subsequent retransmission of the downlink GPRS data blocks. An erroneous forecast may also result in lost downlink GPRS data blocks.

In addition, typical GPRS data block transmission utilizes a sliding window protocol to track the segmented blocks being transmitted from the PCU 130 to the BTS 120. The sliding protocol entails sequentially assigning a Block Sequence Number (BSN) to each segmented block. The PCU 130 may then request acknowledgement from the MS 122 of receipt of the GPRS data block associated with a particular BSN. The number of GPRS data blocks that may be transmitted before an acknowledgement from the MS 122 is required is limited by a "window size." The window size of the sliding protocol, however, is only 64 GPRS data blocks long. Therefore, if the PCU 130 has not received an acknowledgement of receipt of a GPRS data block N, a GPRS data block N+64 cannot be sent to the MS 122, resulting in "stalling" of GPRS data block transmission to the MS 122

In some instances, factors such as the signal strength, block error rate, bit error rate, etc., may erroneously indicate that a transition to the higher channel coding scheme is warranted. This typically occurs with transitions from CS-3 to CS-4 and can result in high block error rates as well as stalling and/or lost GPRS data blocks.

Figure 7:
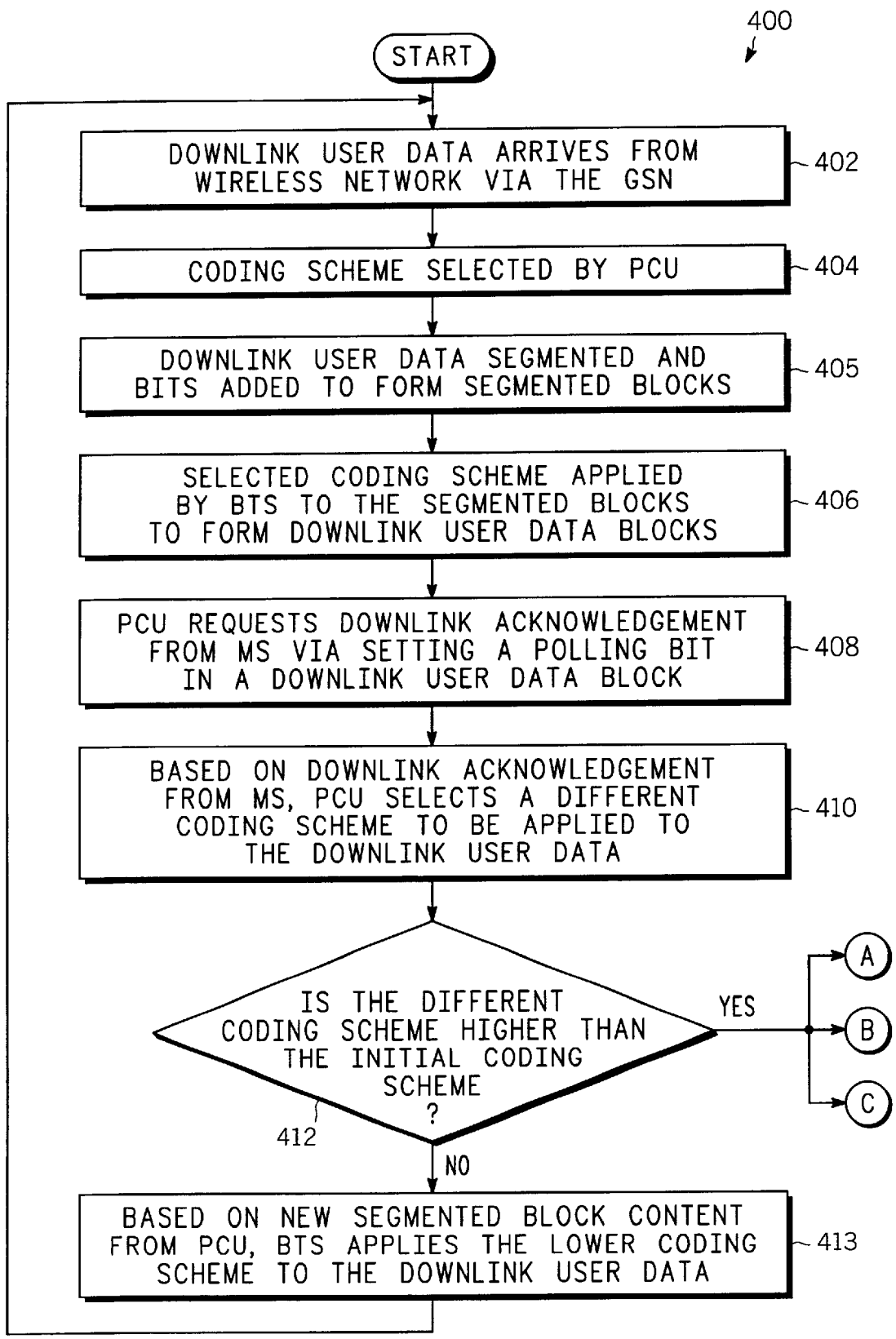
FIG. 7 is a flowchart illustrating the steps of initiating a channel coding scheme transition for downlink user data of the wireless communication network shown in FIG. 1.

FIG. 7 is a flowchart illustrating the steps of initiating a channel coding scheme transition 400 for downlink user data of the wireless communication network shown in FIG. 1. Referring to FIG. 7, the steps of initiating a channel coding scheme transition 400 for downlink user data begins at a block 402 where downlink user data arrives as an LLC frame from the GPRS specific network configuration 112 (i.e., the IP internet 126) via the GSN 128. Upon receipt of the downlink user data, the PCU 130 selects a GPRS PDTCH coding scheme, typically CS-2 to start, at a block 404. The PCU 130 then segments the LLC into groups of bits and inserts additional information bits (e.g., polling bits, data encoding instruction bits, BSNs) into the groups if bits to form segmented blocks, at a block 405. Thus, each segmented block contains the information necessary to specify the selected GPRS PDTCH coding scheme (e.g., CS-2) to be applied by the BTS 122. Next, at a block 406, the BTS 120 applies the selected GPRS PDTCH coding scheme to the segmented blocks to form downlink user data blocks transmitted by the BTS 120 to the MS 122. The downlink data blocks may be one of two types; either a signaling data block or payload data block (discussed below).

During transmission of the downlink user data blocks, the PCU 130 periodically requests, from the MS 122, an indication of downlink user data block delivery success to the MS 122, at a block 408. Such an indication, referred to herein as a "Downlink Acknowledgement" may be requested by the PCU 130 via setting a polling bit in a segmented block. The resulting Downlink Acknowledgement, typically encoded via a CS-1, is transmitted via an uplink control block rather than an uplink user data block on the uplink channel 124.

For example, a downlink user data block formed from a segmented block having a poll bit set to one will invoke a Downlink Acknowledgement from the MS 122 if received by the MS 122. The downlink user data block intended to invoke a Downlink Acknowledgement from the MS 122 may be referred to herein as a "signaling data block." Conversely, a downlink user data block formed from a segmented block having a poll bit set to zero will not invoke a Downlink Acknowledgement and may therefore be referred to herein as a "payload data block."

Figure 8:
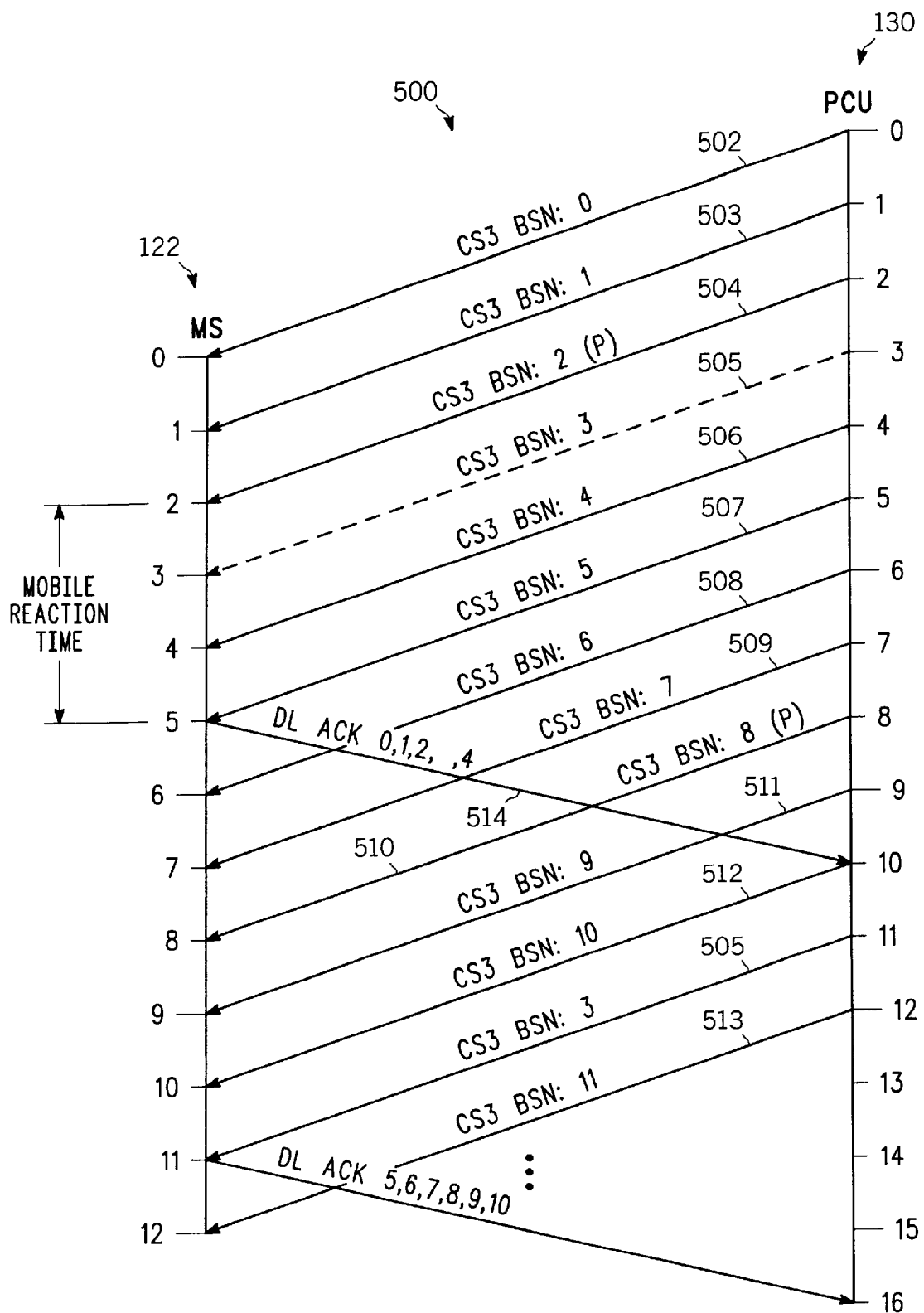
FIG. 8 is an example time line illustrating transmission of a series of downlink user data blocks and corresponding Downlink Acknowledgements.

As previously mentioned, each of the downlink data blocks is identified by a BSN added by the PCU 130 to the layer 2 bits received from the GSN 128. Accordingly, transmission block error rates may be monitored by the PCU 130 using the BSN. FIG. 8 is an example time line 500 illustrating transmission of a series of payload data blocks (i.e., without poll bits set), and signaling data blocks (i.e., with poll bits set), and corresponding Downlink Acknowledgements.

Referring to FIG. 8, a series of downlink user data blocks numbered as BSN: 1 through BSN: 11 corresponding to downlink user data blocks 502 through 513, respectively, and encoded using the CS-3 340 are transmitted to the MS 122 from the PCU 130. The user data blocks, 502, 503, 505, 506, 507, 508, 509, 511, 512, and 513 are configured as payload data blocks. The user data blocks 504 and 510 are configured as signaling data blocks with a poll bit set (as indicated by a "P") to request a Downlink Acknowledgement. In addition, 16 block periods are denoted on the right-hand side, and 12 block periods are denoted on the left-hand side of the example time line 500.

During operation of the example time line 500, the downlink user data block 502 is transmitted from the PCU 130 to the MS 122. One block period later, the downlink user data block 503 is transmitted from the PCU 130 to the MS 122.

One block period later, the user data block 503 is transmitted from the PCU 130 to the MS 122. Two block periods later, the user data block 504, configured as a signaling data block, is transmitted from the PCU 130 to the MS 122. Similarly, user data blocks 506, 507, and 508 are transmitted by the PCU 130 to the MS 122. Upon receipt of the user data block 504, the MS 122 waits three block periods and then acknowledges, via a Downlink Acknowledgement 514, receipt of user blocks 502, 503, 504, and 506, indicating that user data block 505 was not received. The PCU 130 delays transmission of the user data block 513 and instead retransmits user data block 505, followed by transmission of the user data block 513.

If the user data block 505 had been configured as a signaling data block rather than a payload data block the MS 122 would not have acknowledged receipt of previous user data transmitted in a timely fashion. In addition, if the PCU 130 had transmitted 64 unacknowledged user data blocks, subsequent user data block transmission to the MS 122 by the PCU 130 stalls and data transmission ceases. As is known, stalling and retransmission of user data blocks indicating a high user data block error rate may be the result of a number of factors including poor coding scheme decisions by the PCU 130, degraded downlink channel conditions, etc.

Referring again to FIG. 7, upon receipt of the polling bit, the MS 122 responds with a Downlink Acknowledgement identifying all downlink data blocks received since receipt of the previous polling bit. Based on the Downlink Acknowledgement and other channel characteristics, the PCU 130 selects a different GPRS PDTCH coding scheme to be applied to subsequent downlink user data, at a block 410. If it is determined at a decision block 412 that the different GPRS PDTCH channel coding scheme is not a higher channel coding scheme (indicating poor downlink user data block delivery) the PCU 130 may, via the information bits in the segmented blocks, direct the BTS 120 to apply the same or a lower GPRS PDTCH coding scheme to the downlink user data at a block 413. If it is determined at the decision block 412 that the different GPRS PDTCH channel coding scheme is higher than the selected coding scheme (initially CS-2) the PCU 130 applies a downlink channel coding transition method constructed in accordance with the preferred embodiments of the invention.

Figure 9:
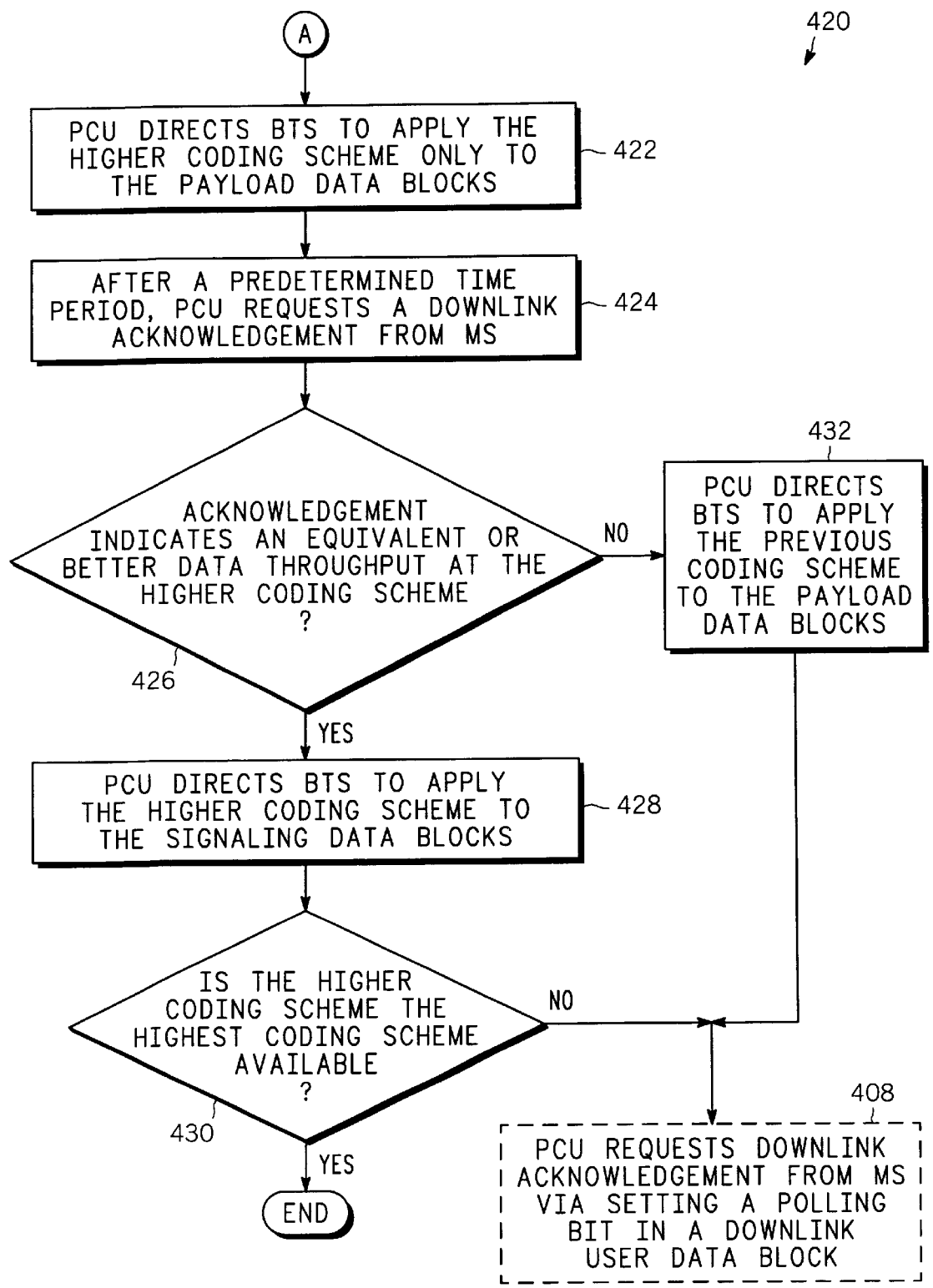
FIG. 9 a flow chart illustrating a first channel coding transition method for the downlink user data of FIG. 7.

FIG. 9 is a flow chart illustrating a first channel coding transition method 420 for the downlink user data of FIG. 7.

Referring to FIG. 9, the first channel coding transition method 420 is implemented to determine a likelihood of a successful channel coding scheme transition via application of a higher channel coding scheme to the payload data blocks during a predetermined period. The predetermined period is defined in terms of packet polling periods (i.e., the time elapsed between receipt of consecutive downlink acknowledgements). For example, the predetermined time period may be equivalent to one packet polling period (shown as 6 block periods in FIG. 8), two packet polling periods, three packet polling periods, etc.

At a block 422, the PCU 130 directs the BTS 120 to apply the higher GPRS PDTCH coding scheme to only the payload data blocks. The PCU 130 preferably directs application of the higher coding scheme to the payload data blocks via bits inserted in the appropriate segmented blocks. The signaling data blocks, however, continue to be transmitted at the lower coding scheme. After the predetermined time period has elapsed at a block 424, the PCU 130 requests a Downlink Acknowledgement via a signaling data block to the MS 122.

If the Downlink Acknowledgement received from the MS 122 indicates an equivalent or improved data throughput for the payload data blocks transmitted at the higher GPRS PDTCH coding scheme at a decision block 426, the PCU 130 directs the BTS 120 to transmit subsequent signaling data blocks at the higher GPRS PDTCH coding scheme at a block 428. The PCU 130 preferably directs the application of the higher coding scheme to the signaling data blocks via bits inserted in the appropriate segmented blocks. Thus, both the payload data blocks and the signaling data blocks are transmitted from the BTS 120 to the MS 122 using the higher GPRS PDTCH channel coding scheme.

If, however, the Downlink Acknowledgement received from the MS 122 indicates a degraded data throughput for the payload data blocks transmitted at the higher GPRS PDTCH coding scheme at a decision block 426, the PCU 130 directs the BTS 120 to transmit subsequent payload data blocks using the previous GPRS PDTCH coding scheme (i.e. the selected lower channel coding scheme) at a block 432. Thus, both the payload data blocks and the signaling data blocks are transmitted from the BTS 120 to the MS 122 using the previous GPRS PDTCH channel coding scheme. In this way, the downlink user data is transitioned from a lower channel coding scheme to a higher channel coding scheme via the first channel coding transition method 420 thereby allowing the PCU 130 to "test" downlink capability of the communication channel 124 prior to committing both the signaling and payload data blocks to encoding at the higher channel coding scheme.

If the higher channel coding scheme (e.g., the CS-3 340) is not the highest coding scheme available, the PCU 130 may again request a Downlink Acknowledgement from the MS 122 as described in connection with the block 408, and transmission of downlink data blocks may continue as described in connection with FIGS. 7 and 8 until all data packets are sent and their receipt by the MS 122 is verified.

Figure 10:
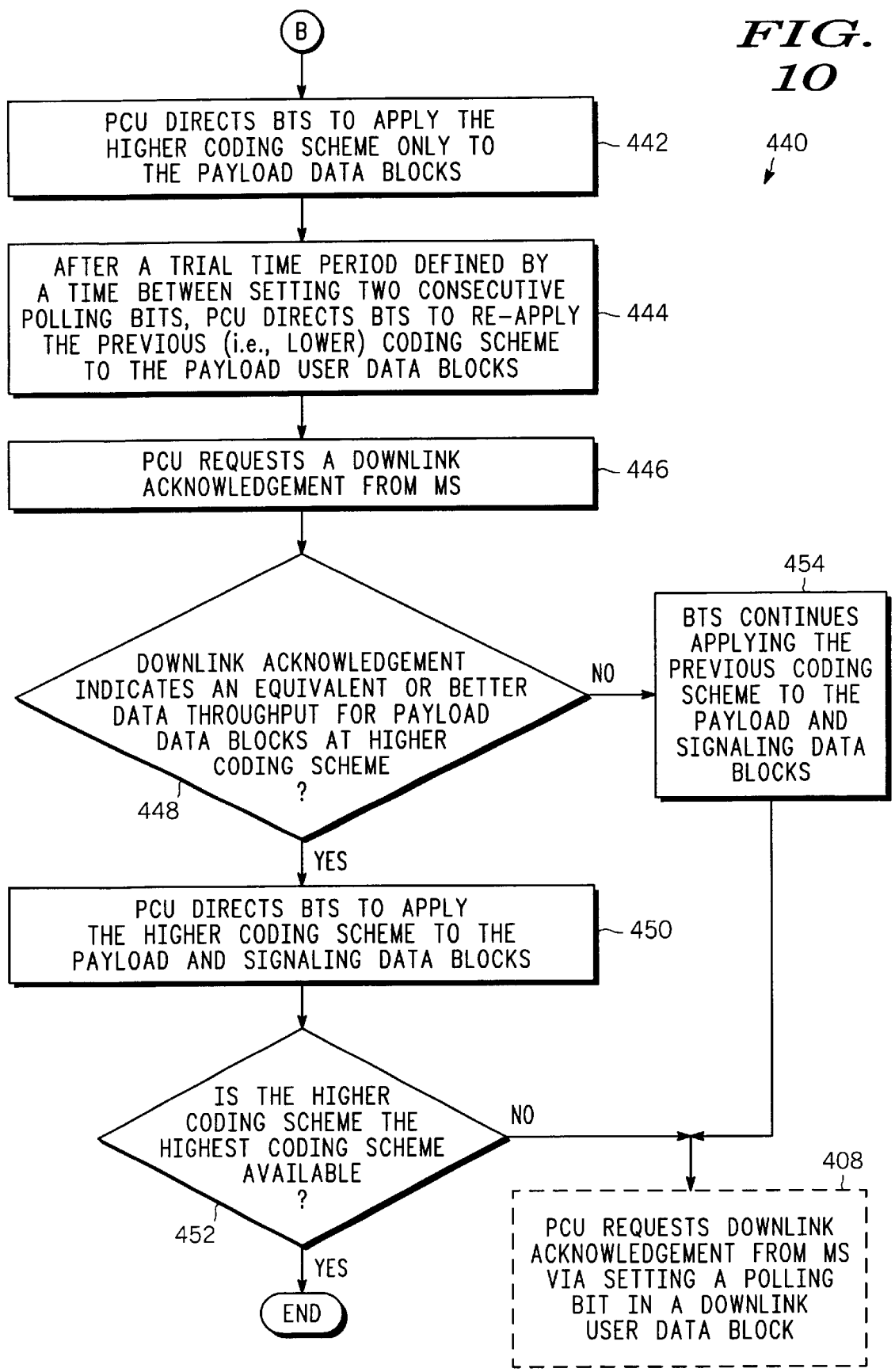
FIG. 10 is a flow chart illustrating a second channel coding transition method for the downlink user data of FIG. 7.

FIG. 10 is a flow chart illustrating a second channel coding transition method 440 for the downlink user data of FIG. 7. Referring to FIG. 10, the second channel coding transition method 440 is implemented to determine a likelihood of a successful channel coding scheme transition via application of a higher channel coding scheme to the payload data blocks during a trial time period. The trial time period is defined as the time elapsed between setting two consecutive polling bits (requesting consecutive Downlink Acknowledgements).

At a block 442, the PCU 130 directs the BTS 120 to apply the higher GPRS PDTCH coding scheme to only the payload data blocks. The PCU 130 preferably directs application of the higher coding scheme to the payload data blocks via bits inserted in the appropriate segmented blocks. The signaling data blocks, however, continue to be transmitted at the lower coding scheme. After trial time period has elapsed, at a block 444, the PCU 130 directs the BTS 120 to apply the previous GPRS PDTCH channel coding scheme to the payload data blocks (i.e., revert back to lower channel coding scheme). Concurrently, or immediately thereafter, at a block 446, the PCU 130 requests a Downlink Acknowledgement from MS 122 via setting a polling bit in a downlink data block (i.e., a signaling data block).

If the subsequent Downlink Acknowledgement received from the MS 122 indicates an equivalent or improved data throughput for the payload data blocks transmitted at the higher GPRS PDTCH coding scheme at a decision block 448, the PCU 130 directs the BTS 120 to transmit subsequent payload and signaling data blocks at the higher GPRS PDTCH coding scheme, at a block 450. Thus, both the payload and the signaling data blocks are transmitted from the BTS 120 to the MS 122 using the higher GPRS PDTCH channel coding scheme.

If, however, the Downlink Acknowledgement received from the MS 122 indicates a degraded data throughput for the payload data blocks transmitted at the higher GPRS PDTCH coding scheme, the PCU 130 directs the BTS 120 to continue transmitting all downlink data blocks using the previous GPRS PDTCH coding scheme (i.e. the lower channel coding scheme) at a block 454. Thus, both the payload data blocks and the signaling data blocks are transmitted from the BTS 120 to the MS 122 using the previous GPRS PDTCH channel coding scheme. In this way, the downlink user data is transitioned from a lower channel coding scheme to a higher channel coding scheme via the second channel coding transition method 440 thereby allowing the PCU 130 to "test" downlink capability of the communication channel 124 prior to committing both the signaling and payload data blocks to encoding at the higher channel coding scheme.

If the higher channel coding scheme (e.g., the CS-3 340) is not the highest coding scheme available, the PCU 130 may again request a Downlink Acknowledgement from the MS 122 as described in connection with the block 408, and transmission of downlink data blocks may continue as described in connection with FIGS. 7 and 8 until all data packets are sent and their receipt by the MS 122 is verified.

Figure 11:
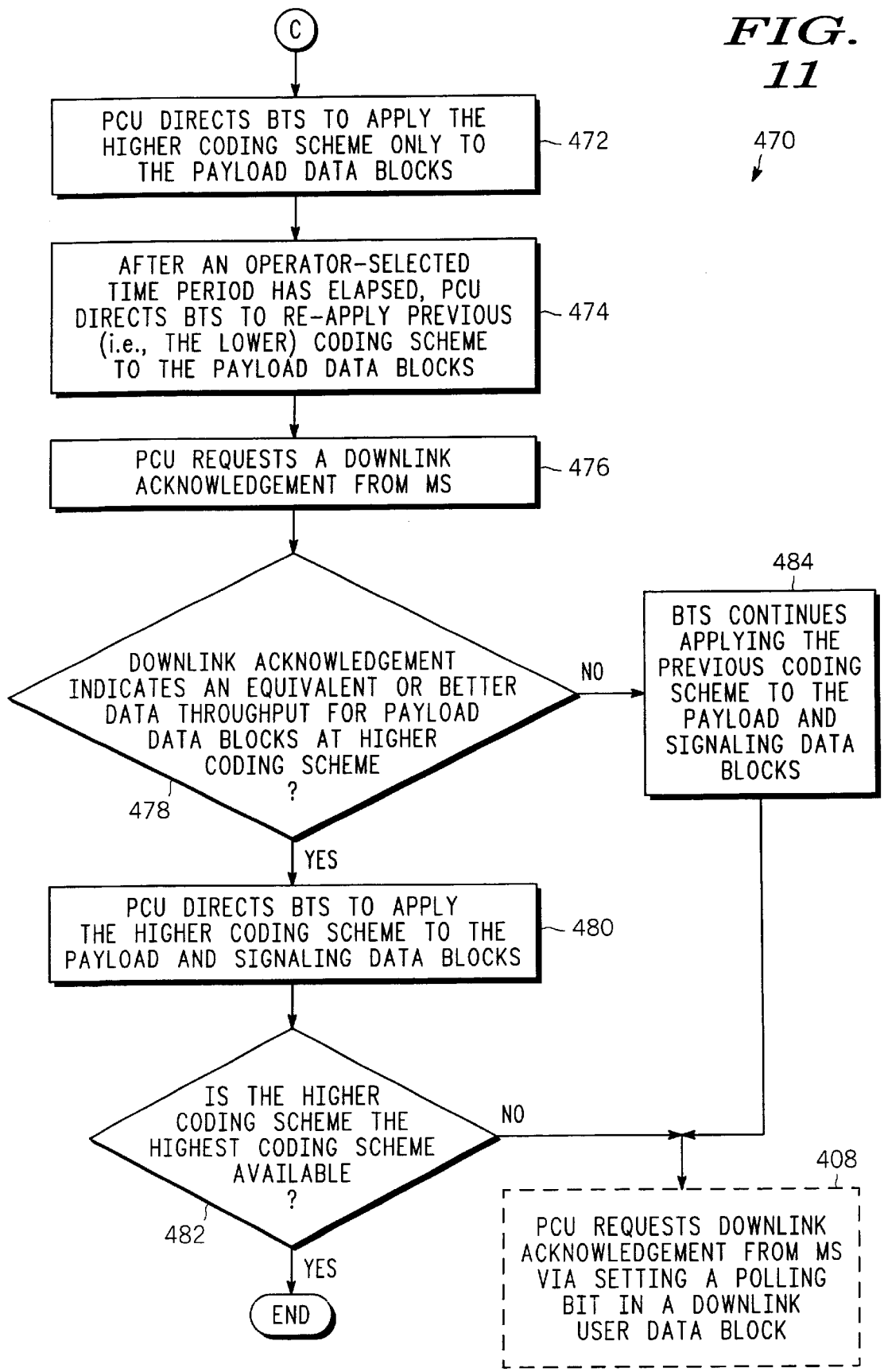
FIG. 11 is a flow chart illustrating a third channel coding transition method for the downlink user data of FIG. 7.

FIG. 11 is a flow chart illustrating a third channel coding transition method 470 for the downlink user data of FIG. 7. Referring to FIG. 11, the third channel coding transition method 470 is implemented to determine a likelihood of a successful channel coding scheme transition via application of a higher channel coding scheme to the payload data blocks during an operator-selected time period. The operator-selected time period is equivalent to a time period defined by an operator-selected number of blocks transmitted, or "block periods".

At a block 472, the PCU 130 directs the BTS 120 to apply the higher GPRS PDTCH coding scheme to only the payload data blocks. The PCU 130 preferably directs application of the higher GPRS PDTCH coding scheme to the payload data blocks via bits inserted in the appropriate segmented blocks. The signaling data blocks, however, continue to be transmitted at the lower GPRS PDTCH coding scheme. After an operator-selected time period has elapsed at a block 474, the PCU 130 directs the BTS 120 to revert back to the lower GPRS PDTCH coding scheme. At a block 476, the PCU 130 requests a Downlink Acknowledgement from the MS 122 via setting a polling bit in a downlink data block (i.e., signaling block). Although shown after the block 474, the request for the Downlink Acknowledgement at the block 476 may occur before the operator-selected time period has elapsed. If the subsequent Downlink Acknowledgement received from the MS 122 indicates an equivalent or improved data throughput for the payload data blocks transmitted at the higher GPRS PDTCH coding scheme at a decision block 478, the PCU 130 directs the BTS 120 to transmit subsequent payload and signaling data blocks at the higher GPRS PDTCH coding scheme at a block 480. Thus, both the payload data blocks and the signaling data blocks are transmitted from the BTS 120 to the MS 122 using the higher GPRS PDTCH channel coding scheme.

If, however, the Downlink Acknowledgement received from the MS 122 indicates a degraded data throughput for the payload data blocks transmitted at the higher GPRS PDTCH coding, the BTS 120 continues applying the previous GPRS PDTCH coding scheme to the payload and signaling data blocks, at a block 484. Thus, both the payload data blocks and the signaling data blocks are transmitted from the BTS 120 to the MS 122 using the lower GPRS PDTCH channel coding scheme. In this way, the downlink user data is transitioned from a lower channel coding scheme to a higher channel coding scheme via the third channel coding transition method 470 thereby allowing the PCU 130 to "test" downlink capability of the communication channel 124 prior to committing both the signaling and payload data blocks to encoding at the higher channel coding scheme.

If the higher channel coding scheme (e.g., the CS-3 340) is not the highest coding scheme available, the PCU 130 may again request a Downlink Acknowledgement from the MS 122 as described in connection with the block 408, and transmission of downlink data blocks may continue as described in connection with FIGS. 7 and 8 until all data packets are sent and their receipt by the MS 122 is verified.

Figure 12:
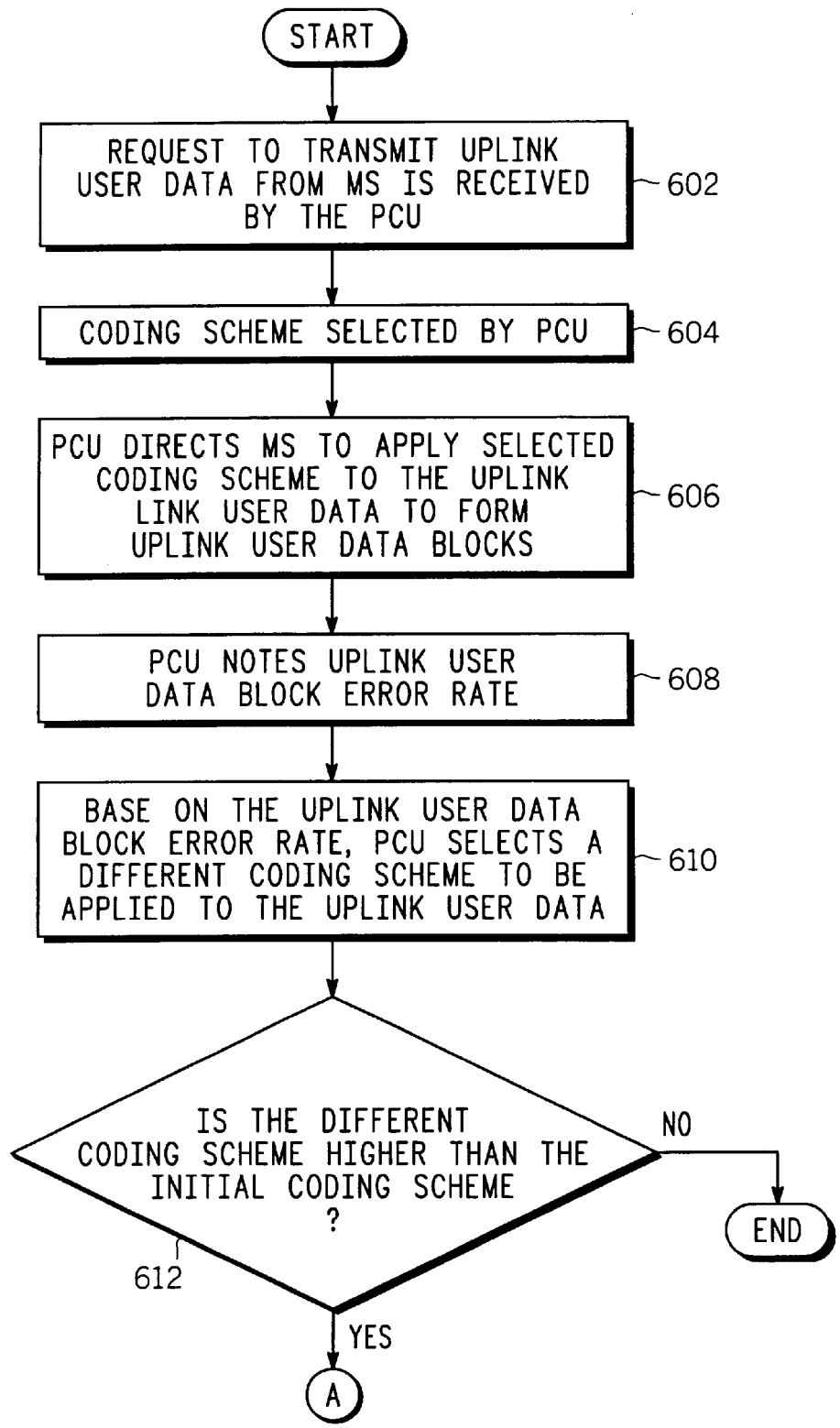
FIG. 12 is a flowchart illustrating the steps of initiating a channel coding scheme trial period transition for uplink user data of the wireless communication network shown in FIG. 1.

FIG. 12 is a flowchart illustrating the steps of initiating a channel coding scheme trial period transition 600 for uplink user data of the wireless communication network shown in FIG. 1. In the uplink case, although the PCU 130 controls transmission of uplink user data, it does so via a Packet Uplink Acknowledgement/No Acknowledgement message to the MS 122 rather than setting a polling bit as in the case of downlink user data transmission.

Referring to FIG. 12, the steps of initiating a channel coding scheme trial period transition 600 begins at a block 602 where the PCU 130 receives a request from the MS 122, via receipt of a Request Packet (i.e. a packet request reference) to transmit uplink user data to the wireless communication network 100 from the MS 122. Upon receipt of the Request Packet, the PCU 130 selects a GPRS PDTCH channel coding scheme, typically the CS-2 300 to start, at a block 604, and directs the MS 122 to apply a selected GPRS PDTCH coding scheme to the uplink user data, at a block 606. The identity of the selected coding scheme is transmitted from the PCU 130 to the MS 122 via either a Packet Uplink Assignment message at the time of packet transfer establishment, or in the Packet Uplink Acknowledgement/No Acknowledgement message sent periodically throughout data transmission. At a block 608, upon subsequent transmission of the uplink user data encoded at the selected GPRS PDTCH channel coding scheme, the PCU 130 notes an uplink user data block error rate. Next, based on the uplink user data block error rate, the PCU 130 selects a different GPRS PDTCH channel coding scheme at a block 610. Typically, a high user data block error rate indicates a need for application of a lower GPRS PDTCH channel coding scheme. If it is determined at the decision block 612 that the different GPRS PDTCH channel coding scheme is higher than the selected coding scheme, the PCU 130 applies an uplink channel coding trial period transition method such as described herein.

Figure 13:
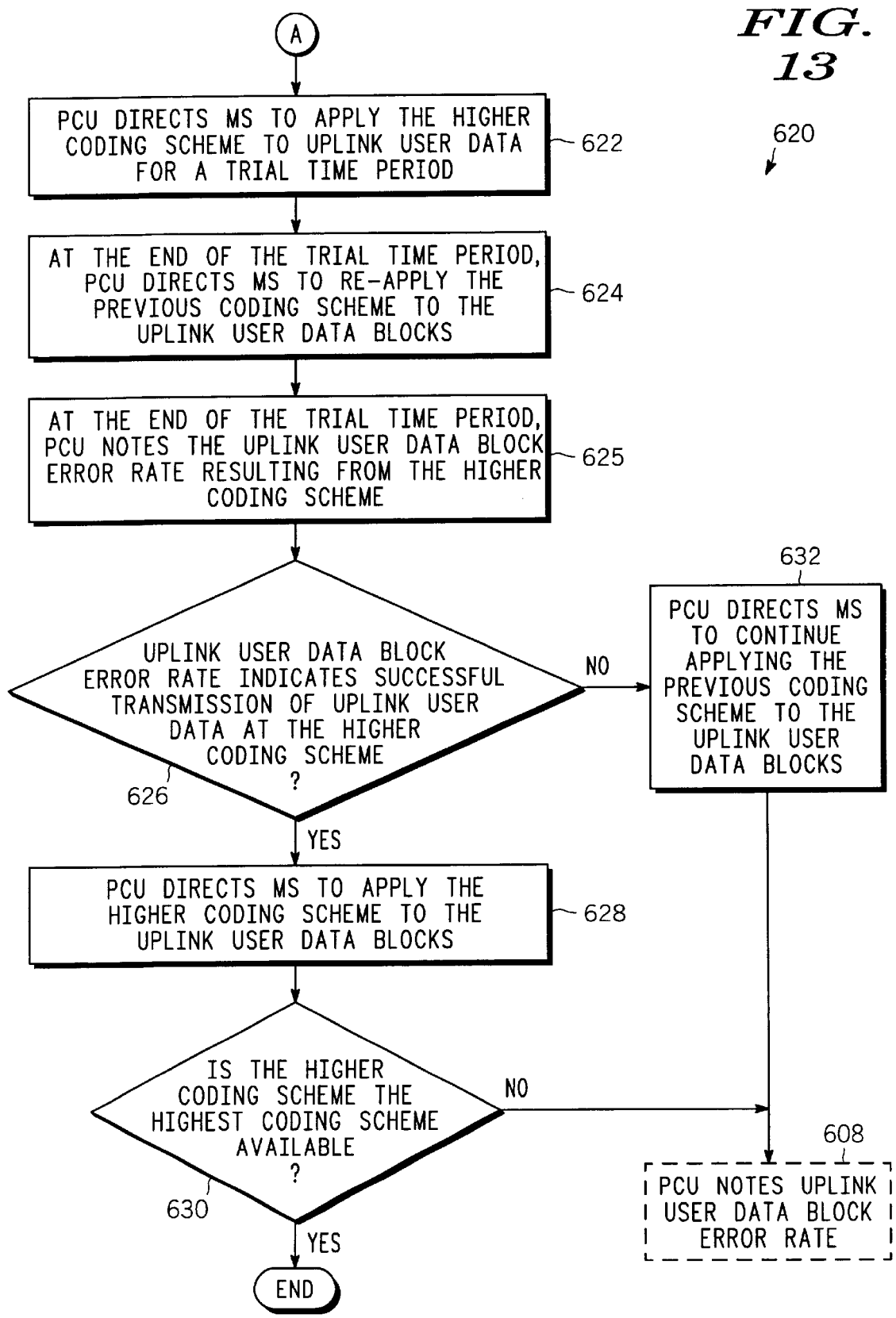
FIG. 13 is a flow chart illustrating a channel coding trial period transition method for the uplink user data of FIG. 12.

FIG. 13 is a flow chart illustrating an uplink channel coding trial period transition method 620 for the uplink user data of FIG. 12. Referring to FIG. 13, the uplink channel coding trial period transition method 620 is implemented to determine a likelihood of a successful channel coding scheme transition via application of a higher channel coding scheme to the uplink user data blocks for a trial time period.

At a decision block 622, if the different GPRS PDTCH coding scheme is higher than the selected GPRS PDTCH coding scheme, the PCU 130 directs the MS 122 to apply the higher GPRS PDTCH coding scheme to the uplink user data blocks for a trial time period. Although the trial time period may be defined in any number of ways, for example, by time elapsed, the trial time period is preferably defined in terms of a sequential number of blocks transmitted from the MS 122 to the PCU 130. Direction to the MS 122 of the trial time period may be accomplished via the addition of a new selectable option to an existing parameter. For example, a selectable (via the PCU 130) option specifying that a higher coding scheme be applied to uplink user data for a trial time period equivalent to, 200 sequential user data blocks may be added to an existing Uplink Fractional Coding Scheme Duration parameter. Thus when received, the new selectable option added to the Uplink Fractional Coding Scheme Duration parameter directs the MS 122 to apply the higher coding scheme to the uplink user data for the trial time period.

At the end of the trial time period, the PCU 130 directs the MS 122 to revert back to the previous (lower) GPRS PDTCH coding scheme, at a block 624, and notes the uplink user data block error rate at a block 625, as follows. First, the PCU 130 notes the number of successfully received uplink user data blocks, herein denoted as $B_s$, and the number of unsuccessfully received uplink user data blocks, herein denoted to as $B_u$. Thus, the total number of uplink user data blocks transmitted at the higher coding scheme may be denoted as $B_t = B_s + B_u$.

Second, the PCU 130 notes the actual throughput of the uplink user data blocks at the higher channel coding scheme, calculated by the PCU 130 as, $$ActualThroughput = \frac{Bs * HighCSSize}{Time}$$

where, HighCSSize=data payload byte quantity at the higher channel coding scheme.

Similarly, the PCU 130 notes the equivalent throughput of the user data blocks at the lower channel coding scheme, calculated by the PCU 130 as $$EquivalentThroughput = \frac{Bt * LowCSSize}{Time}$$

where, LowCSSize=data payload byte quantity at the lower channel coding scheme.

Third, the ActualThroughput and the EquivalentThroughput are compared by the PCU 130:

If the ActualThroughput≧EquivalentThroughput, then the uplink channel coding trial period indicates that a full transition to the higher channel is reasonable, and the PCU 130 directs the MS 122 to apply the higher, or new, channel coding scheme to subsequent uplink user data.

If, however, the ActualThroughput<EquivalentThroughput, then the uplink channel coding trial period indicates that a full transition to the higher channel coding scheme is not reasonable, and the uplink user data continues to be transmitted at the lower, or original channel coding scheme.

Thus, if the uplink user data block error rate indicates successful transmission of uplink user data at the higher coding scheme at a decision block 626, the PCU 130 directs the MS 122 to re-apply the higher GPRS PDTCH coding scheme to subsequent uplink user data blocks. Direction to the MS 122 to apply the higher GPRS PDTCH channel coding may be accomplished via an assignment message, for example, a Packet Uplink Assignment message or a Packet Uplink Ack/Nack message, transmitted by the PCU 130 to the MS 122. If, however, the uplink user data block error rate does not indicate successful transmission of uplink user data at the higher coding scheme at a decision block 626, the PCU 130 directs the MS 122 to continue application of the previous (i.e., lower) GPRS PDTCH coding scheme to the uplink user data blocks, at a block 632.

In this way, the uplink user data is transitioned from a lower channel coding scheme to a higher channel coding scheme based on a trial time period orchestrated by the PCU 130 to "test" uplink capability of the communication channel 124 prior to fully committing the uplink user data blocks to encoding at the higher channel coding scheme.

If the higher channel coding scheme (e.g., the CS-3 340) is not the highest coding scheme available, the PCU 130 may again request a Downlink Acknowledgement from the MS 122 as described in connection with the block 628, and transmission of downlink data blocks may continue as described in connection with FIGS. 12 and 13 until all uplink user data packets are transmitted and their receipt by the PCU 130 is verified.

In summary, persons of ordinary skill in the art will readily appreciate that a method for transitioning from a lower channel coding scheme to a higher channel coding scheme has been provided. Systems using the example apparatus and methods described herein may benefit from reduced block error rate (resulting from poor coding scheme decisions), fewer retransmissions of user data blocks, and increased battery life of the mobile stations, increased spectral efficiency and higher user data throughput to an end user.

Although certain apparatus constructed in accordance with the teachings of the invention have been described herein the scope of coverage of this patent is not limited thereto. On the contrary, this patent covers all embodiments of the teachings of the invention fairly falling within the scope of the appended claims either literally or under the doctrine of equivalents.

What is claimed is:

1. A wireless communication network providing data services to a plurality of mobile stations via a corresponding plurality of radio links, each of the plurality of radio links having a downlink transmission capability from the wireless communication network to a mobile station and an uplink transmission capability from the mobile station to the wireless communication network the wireless communication network comprising:

a packet control unit (PCU) operatively coupled to the wireless communication network and the plurality of mobile stations, the PCU for directing application of a channel encoding scheme selected from a plurality of channel coding schemes to data transmitted between the wireless communication network and the mobile station, the application of the channel coding scheme resulting in a series of encoded data blocks, the PCU comprising a processor and a memory operatively coupled to the processor, the PCU being programmed to direct application of a first channel coding scheme to a first portion of data transmitted between the wireless communication network and one of the mobile station, the PCU being programmed to direct application of a second channel coding scheme to a second portion of data transmitted between the wireless communication network and the mobile station, and the PCU being programmed to direct application of the second channel coding scheme to future data transmitted between the wireless communication network and the mobile station using the second channel coding scheme if a data block error rate of the portion of data encoded using the second channel coding scheme indicates an equivalent or higher data throughput of the portion of data encoded using the second channel coding scheme.

2. A communication network as defined in claim 1, wherein the first channel coding scheme comprises a lower channel coding scheme than the second channel coding scheme, the lower channel coding scheme providing an increased protection from a radio link error.

3. A communication network as defined in claim 1, wherein the first and second channel coding schemes comprise General Packet Radio Service packet data traffic channel (GPRS PDTCH) coding schemes.

4. A communication network as defined in claim 1, wherein the predetermined time period comprises an operator-selected time period.

5. A communication network as defined in claim 1, wherein the predetermined time period comprises a PCU-selected time period.

6. In a communication network having at least one base transceiver station (BTS) operatively coupled to a packet control unit (PCU) comprising a processor and a memory, the communication network providing data services to a plurality of mobile stations via a corresponding plurality of radio links, each of the plurality of radio links having a downlink transmission capability to transmit payload data blocks and signaling data blocks from the communication network to a mobile station and an uplink transmission capability to transmit uplink data blocks from the mobile station to the communication network the signaling data blocks, the payload data blocks and the uplink data blocks resulting from encoding data using one of a plurality of channel coding schemes, the signaling data blocks including a request for a downlink acknowledgement from the mobile station, a method for transitioning from a first channel coding scheme to a second channel coding scheme, the method comprising:

encoding only the payload data blocks using the second channel coding scheme;

after a predetermined time period, generating a request for a downlink acknowledgement in a signaling data block encoded using the first channel coding scheme; and responsive to the downlink acknowledgement, encoding future signaling data blocks using the second channel coding scheme.

7. A method for transitioning from a first channel coding scheme to a second channel coding scheme as defined in claim 6 wherein the future signaling data blocks are encoded using the second coding scheme if the downlink acknowledgement indicates an equivalent or higher data throughput of the payload data blocks encoded using the second channel encoding scheme.

8. A method for transitioning from a first channel coding scheme to a second channel coding scheme as defined in claim 6, wherein the first channel coding scheme comprises a lower channel coding scheme than the second channel coding scheme, the lower channel coding scheme providing an increased protection from a radio link error.

9. A method for transitioning from a first channel coding scheme to a second channel coding scheme as defined in claim 6, wherein the first and second channel coding schemes comprise General Packet Radio Service packet data traffic channel (GPRS PDTCH) coding schemes.

10. A method for transitioning from a first channel coding scheme to a second channel coding scheme as defined in claim 6, wherein the predetermined time period comprises an operator-selected time period.

11. In a communication network having at least one base transceiver station (BTS) operatively coupled to a packet control unit (PCU) comprising a processor and a memory, the communication network providing data services to a plurality of mobile stations via a corresponding plurality of radio links, each of the plurality of radio links having a downlink transmission capability to transmit payload data blocks and signaling data blocks from the communication network to a mobile station and an uplink transmission capability to transmit uplink data blocks from the mobile station to the communication network the signaling data blocks, the payload data blocks and the uplink data blocks resulting from encoding data using one of a plurality of channel coding schemes, the signaling data blocks including a request for a downlink acknowledgement from the mobile station, a method for transitioning from a first channel coding scheme to a second channel coding scheme, the method comprising:

encoding only the payload data blocks transmitted to the mobile station using a second channel coding scheme;

after a trial time period, encoding the payload data blocks transmitted to the mobile station using a first channel coding scheme;

after the trial time period, generating a request for a downlink acknowledgement in a signaling data block using the first channel coding scheme; and responsive to the downlink acknowledgement, encoding future signaling and payload data blocks using the second channel coding scheme.

12. A method for transitioning from a first channel coding scheme to a second channel coding scheme as defined in claim 11, wherein the future signaling data blocks are encoded using the second coding scheme if the downlink acknowledgement indicates an equivalent or higher data throughput of the payload data blocks encoded using the second channel coding scheme.

13. A method for transitioning from a first channel coding scheme to a second channel coding scheme as defined in claim 11, wherein said data comprises internet protocol data.

14. A method for transitioning from a first channel coding scheme to a second channel coding scheme as defined in claim 11, wherein the first channel coding scheme comprises a lower channel coding scheme than the second channel coding scheme, the lower channel coding scheme providing an increased protection from a radio link error.

15. A method for transitioning from a first channel coding scheme to a second channel coding scheme as defined in claim 11, wherein the first and second channel coding schemes comprise General Packet Radio Service packet data traffic channel (GPRS PDTCH) coding schemes.

16. A method for transitioning from a first channel coding scheme to a second channel coding scheme as defined in claim 11, wherein the trial time period comprises a period of time defined by the request for the downlink acknowledgement and a request immediately previous to the request for the downlink acknowledgement.

17. A communication network as defined in claim 11, wherein the trial time period comprises an operator-selected time period.

18. In a communication network having at least one base transceiver station (BTS) operatively coupled to a packet control unit (PCU) comprising a processor and a memory, the communication network providing data services to a plurality of mobile stations via a corresponding plurality of radio links, each of the plurality of radio links having a downlink transmission capability to transmit payload data blocks and signaling data blocks from the communication network to a mobile station and an uplink transmission capability to transmit uplink data blocks from the mobile station to the communication network, the signaling data blocks, the payload data blocks and the uplink data blocks resulting from encoding data using one of a plurality of channel coding schemes, the signaling data blocks including a request for a downlink acknowledgement from the mobile station, a method for transitioning from a first channel coding scheme to a second channel coding scheme, the method comprising:

encoding the data using a second channel coding scheme to form a first plurality of uplink data blocks;

after a trial time period, encoding the data using a first channel coding scheme to form a second plurality of uplink data blocks; and after the trial time period, encoding future data using the second channel coding scheme if an uplink user data block error rate of the first plurality of uplink data blocks indicates an equivalent or higher data throughput of the data.

19. A communication network as defined in claim 18, wherein the first channel coding scheme comprises a lower channel coding scheme than the second channel coding scheme, the lower channel coding scheme providing an increased protection from a radio link error.

20. A communication network as defined in claim 18, wherein the first and second channel coding schemes comprise General Packet Radio Service packet data traffic channel (GPRS PDTCH) coding schemes.

21. A communication network as defined in claim 18, wherein the trial time period comprises a selectable time period defined by a number of sequential uplink user data blocks transmitted to the BTS.

* * * * *